United States Patent [19]  [11] 3,821,330
Free  [45] June 28, 1974

[54] CONTINUOUS POLYMERIZATION OF ACRYLICS

[75] Inventor: Kevin W. Free, New Castle, Del.

[73] Assignee: E. I. du Pont de Nemours and Company, Wilmington, Del.

[22] Filed: Mar. 3, 1972

[21] Appl. No.: 231,748

Related U.S. Application Data

[63] Continuation-in-part of Ser. No. 887,132.

[52] U.S. Cl............ 260/885, 260/89.5 A, 260/95 C
[51] Int. Cl. ............................................. C08f 15/00
[58] Field of Search............. 260/885, 89.5 A, 95 C

[56] References Cited
UNITED STATES PATENTS

| | | | |
|---|---|---|---|
| 2,391,393 | 12/1945 | Coffman et al.................... | 260/89.5 |
| 2,769,804 | 11/1956 | Hanson............................. | 260/86.7 |
| 3,234,303 | 2/1966 | Bild et al.......................... | 260/876 R |
| 3,474,081 | 10/1969 | Bosworth.......................... | 260/89.5 |
| 3,637,545 | 1/1972 | Fivel................................. | 260/4 |

Primary Examiner—Paul Lieberman

[57] ABSTRACT

Continuous production of acrylic polymers by bulk polymerization of a portion of the acrylic monomers passing through an adiabatic reaction zone, recycling at least 55 percent of the reaction product, separating from the unrecycled portion of the reaction product acrylic polymer.

7 Claims, 1 Drawing Figure

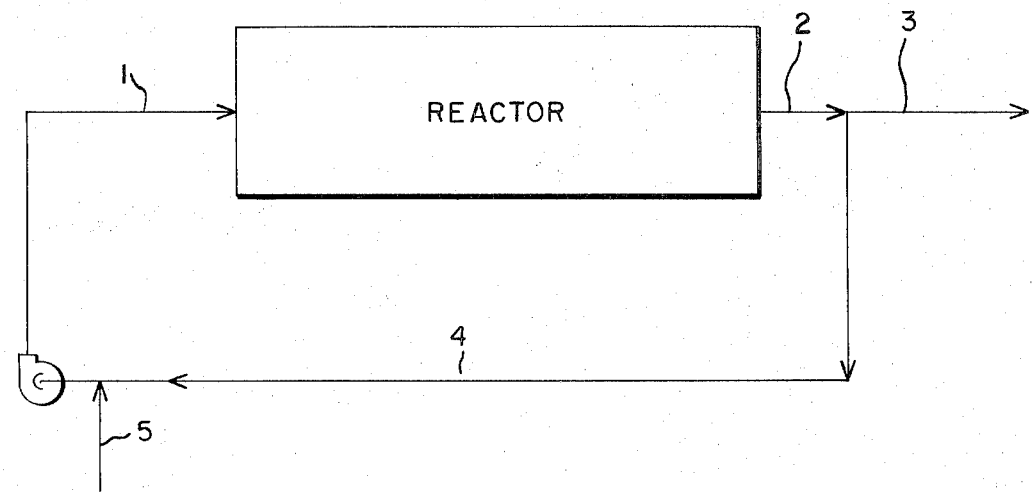

CONTINUOUS POLYMERIZATION OF ACRYLICS

This application is a continuation-in-part of U.S. application Ser. No. 887,132, filed 12/22/69 now abandoned.

The present invention is directed to an improved process for the continuous bulk polymerization of acrylic monomers such as methyl methacrylate. Processes of this general type are known. See U.S. Pat. Nos. 3,234,303 and 2,769,804.

In art bulk polymerization processes for the manufacture of acrylic polymer, as polymerization takes place along the length of the reactor, the polymer tends to become more viscous. The more viscous polymer builds up along the walls of the reactor effectively reducing the volume of reactor available for reaction.

Further, heat transfer problems tend to occur due to the build-up of polymer on these reactor walls. These variable heat transfer conditions along the length of the reactor, result in unstable operation. In an attempt to maintain an isothermal system wherein the temperature is held constant, the rate of polymerization will vary along the length of the reactor due to non-uniform utilization of the initiator along the reactor length. The rate of formation of radicals from an initiator in such a system decreases as the initiator is used up as the reaction progresses along the length of the reactor. These and other features of art processes which cause non-uniformities are minimized or substantially eliminated by the utilization of the present system which simply and economically gives improved utilization of reactor volume while providing uniform and high molecular weight polymer.

The present invention is a process for the continuous bulk polymerization of acrylic polymer comprising a. feeding a stream comprising methyl methacrylate monomer and polymer syrup comprising polymer containing monomeric units derived from methyl methacrylate monomer, an initiator and a telogen to a reaction zone, said stream containing between 30 and 80 percent monomeric components and entering the reaction zone at a temperature of 120° to 170° C., b. advancing said stream through said reaction zone at a stream temperature between 120°–200° C. with a substantially uniform temperature rise of a total between 10°–30° C. along the reaction zone, maintaining the reaction zone under substantially adiabatic conditions, c. withdrawing from said zone a polymer syrup having between 25 and 75 percent polymer.

Typically between 1–25 percent of the monomeric components is ethyl acrylate.

Preferably, the methyl methacrylate syrup which is part of the feed to the reaction zone comprises recycle syrup which may be substantially at the temperature of the product stream. Syrup feed comprising polymer and unreacted monomer is typically mixed with new monomer which is stored cold to form the feed stream fed to the reaction zone. In a most preferred process the syrup feed component consists essentially of recycle syrup. The initiator may be chosen to have a half life at the reaction zone inlet temperature substantially equal to the residence time per pass in the reaction zone. It would thus be effectively completely utilized in the reaction zone due to temperature rise in said zone and there would be a minimum amount of initiator in the product exiting from the reaction zone.

Typical initiators are tertiary butyl peroxide, tertiary butyl hydroperoxide, tertiary butyl perbenzoate, 2,5-dimethyl-2,5-di(tertiary-butylperoxy)-hexane, 2,5-dimethyl-hexyl-2,5-dihydroperoxide. Preferably, when tertiary butyl perbenzoate, the preferred initiator is used, there is also present at least 0.04 percent water by weight in the feed stream.

The amount of polymer syrup in the feed stream, preferably recycle from the exit stream of the reaction zone should be equal by weight to at least 55 percent by weight of the stream exiting from the reaction zone.

Other comonomers present typically can be selected from the class consisting of butadiene, styrene, α-methyl-styrene, derivatives of bicyclobutane, acrylic and methacrylic acid and their esters.

While in its most preferred embodiments, the reaction takes place in one reaction zone, so that the full life of the initiator may be utilized, it is possible to carry out the process in a number of reaction zones usually utilizing different initiators in each zone.

The overall temperature rise should be between 10°–30° C. The temperature of the stream exiting from the final reaction zone or the reaction zone depending upon which embodiment is utilized, should be not more than 200° C. so that the product may remain stable. Preferably this exit temperature of the discharge stream is not more than 180° C., and preferably the discharge stream has a polymer content of between 25 and 75 percent. Most preferably the discharge stream has between 50 and 70 percent polymer. The product of the final reaction zone or sole reaction zone depending upon the system utilized, may be then subjected to high temperature and reduced pressure either separately or together, in order to volatilize most of the monomer present in the reaction product. This volatilized monomer may be condensed by cooling and recycled to the feed stream. Preferably not more than 5–10 percent of the monomer by weight of the syrup remains in the product stream after this step. The stream may then be processed in an extractor extruder which further works the polymer to remove more residual monomer and which at the same time extrudes a polymer strand or sheet or which may force polymer into a granulator. Monomer removed in the extractor extruder may also be recycled to the feed stream.

The amount of polymer syrup, preferably recycle syrup, in the feed stream is controlled to determine the size of the heat sink in the reaction zone and the consequent temperature rise in the zone for a given polymer formation rate.

As used herein:

"Bulk polymerization" means the direct conversion of liquid monomers to polymer in a reaction system in which the polymer remains soluble in its own monomer. No solvent is needed in such a system.

"Continuous polymerization" means polymerization in which monomer is fed to the reactor system at a steady rate and polymer product is withdrawn at a steady rate over a given time interval.

"Acrylic polymer" means polymer in which the major monomeric component is derived from the monomer methyl methacrylate.

"Initiator" means a chemical or chemicals capable of giving free radicals which will start polymer chain growth in a medium containing monomer.

"Telogen" means a substance or substances which will terminate one growing polymer chain and begin a new one.

"Self-wiping agitators" means agitators in a vessel constructed so that some part of one of two or more agitators passes close to (wipes) one or more of the other agitators every revolution so that every part of the agitator is wiped. Every agitator in the vessel is thus wiped. The walls of the vessel are also wiped by the agitators.

"Advancing" means moving substantially all of the inlet stream through the reaction zone with substantially no build-up of polymer on the walls of the reactor or agitators. This is best accomplished using "self-wiping" agitators in the reaction zone.

"Flow number" means the rate polymer is extruded through an orifice 0.0825 inches in diameter at 230° C. under the pressure by an 0.375 inch diameter piston weighing 3,800 grams.

"Inherent viscosity" is determined in chloroform using a Cannon-Fenske visometer.

$$I.V. = \ln t/t_0/C$$

where:
$t$ is the time for solution efflux
$t_0$ is the time for solvent efflux
$C$ is the concentration of solution gms./100 ml. (approximately 2 is used in the determinations described).

The "300° C. Weight Loss" is the percentage weight loss (not including moisture) by the polymer when held at 300° C. for 30 minutes under nitrogen at atmospheric pressure.

"Free monomer" in polymer is determined by distilling monomer from an acetic acid-water solution and titrating it with potassium permanganate in the presence of sulfuric and periodic acids.

"Recycle" refers to that part of a stream in a process which is withdrawn and returned, with or without further processing, to an earlier point in the process.

"Flashing chamber" means a vessel into which liquid at a temperature above its boiling point at the pressure in the vessel is introduced and allowed to vaporize.

"Extractor — Extruder" means a machine for conveying material, heating it and pressurizing it so that it can be passed through a die. The machine has ports in the walls so that volatile matter may be removed as vapors.

The process is schematically depicted in the drawing in which stream (1) is a feed stream, stream (2) is the discharge stream, stream (3) is the product stream for further finishing and extrusion, stream (4) is the recycle stream and stream (5) is the monomer make-up and monomer recycle from the finisher and extractor extruder. Typical Extractor-Extruders are referred to in *Modern Plastics Encyclopedia*, Volume 45, October 1968 and Volume 46, October 1969, both published by McGraw-Hill.

Useful self-wiping agitated systems are described in Bulletin No. R 2284/68e, entitled "W-P Machines for Process Engineering Issue No. 1 Continuous Machines," issued by Werner & Pfleuderer, Stuttgardt, West Germany.

In the examples which follow, when t-butyl-perbenzoate is the initiator, there is present in the feed stream at least 0.04 percent water by weight.

In the Examples which follow, all parts are by weight unless otherwise specified. "Pph" means pounds per hour.

EXAMPLES 1–5

The reactor used consists of a jacketed chamber 32 inches long with a cross-section defined by two intersecting 2-inch diameter circles on 1.53 inch centers. Two co-rotating screws which wipe each other and the walls are fitted inside the vessel. These screws are double threaded (flighted), each thread (or flight) having an independent beginning and terminus at the beginning and end of the screw.

Syrup is introduced at the "feed end" of the reactor, and withdrawn from the "discharge end." Recycle syrup, a portion of the discharge syrup, is conducted back to the feed end of the reactor through a jacketed ⅜-inch pipe into which fresh monomers, initiator and telogen are pumped. A variable speed gear pump having 10 cc. displacement provides the driving force for circulation through the recycle syrup line.

Syrup from the discharge end of the reactor which is not recycled can be passed through a heated line and is "flashed" into the screws of a twin, non-meshing, 0.8-inch diameter screw extractor-extruder (finisher). Vaporized monomer is collected from the finisher, condensed, mixed with make-up monomer, and returned to the reactor. A strand of molten polymer obtained from the finisher is quenched in water and cut.

In Examples 1 and 2, the telogen is tertiary amyl mercaptan whereas in Examples 3–5 normal butyl mercaptan is used.

In the table, MMA means methyl methacrylate; EA means ethyl acrylate; TAM means ter-amyl-mercaptan; MBM means monomeric butyl mercaptan.

EXAMPLE 6

During a run of 169 hours duration, polymer of 230°C. flow number 2.0 gms./min. and 6.0 gms./min. was made. The operating conditions are as follows:

| | | |
|---|---|---|
| For product of flow number (gms./min.) | 2.0 | 6.0 |
| Monomer makeup solution (lbs./hr.) | 5.6 | 5.6 |
| Recycle monomer solution (lbs./hr.) | 4.8 | 4.8 |
| Initiator solution, in MMA (lbs./hr.) | 0.3 | 0.4 |
| Product rate (lbs./hr.) | 5.7 | 5.6 |
| Recycle syrup rate (lbs./hr.) | 62 | 62 |
| Initiator (Tertiary Butyl Perbenzoate) (gms./hr.) | 2.4 | 2.4 |
| Normal butyl mercaptan (gms./hr.) | 3.3 | 4.9 |
| Monomer solution temperature (°C.) | 30 | 30 |
| Syrup temperature inlet the reactor (°C.) | 148 | 146 |
| Syrup temperature outlet (°C.) | 165 | 167 |
| Temperature of jacket on front half of reactor (°C.) | 150 | 151 |
| Temperature on second half jacket (°C.) | 160 | 162 |
| Finisher Temperature (°C.) | 250 | 300 |

The product from these runs had inherent viscosity of 0.56, 300° C. weight loss 1.9 percent, monomer content 0.3 percent (2.0 flow number material) and inherent viscosity of 0.46, 300° C. weight loss 1.7 percent, monomer content 0.3 percent (6.0 flow number material). Polymer clarity was good and the material molded easily.

The equipment used was the same as that in Examples 1 and 2.

| EXAMPLE | 1 | 2 | 3 | 4 | 5 |
|---|---|---|---|---|---|
| Run | 18 | 18 | 11 | 11 | 22 |
| Feed make-up recipe | 72 lbs. MMA<br>1540 gms. EA<br>61 gms. TAM | Same as No. 1 | 72 lbs. MMA<br>1540 gms. EA<br>44 gms. NBM | Same as No. 3 | 72.0 lbs. MMA<br>1540 gms. EA<br>45 gms. NBM |
| Initiator | 2.55 gms./hr.<br>tert butyl<br>perbenzoate | 2.72 gms./hr.<br>Same as No. 1 | 2.75 gms./hr.<br>Same as No. 1 | 3.05 gms./hr.<br>Same as No. 1 | 3.5 gms./hr.<br>2,5-Dimethylhexyl-<br>2,5-dihydroperoxide |
| % solids in syrup leaving reactor | 53% | 55% | 60% | 44% | 49% |
| Recycle syrup | 49.7 pph | 67.3 pph | 49.5 pph | 47.8 pph | 50.6 pph |
| Product Rate | 5.50 pph | 5.91 pph | 6.34 pph | 5.03 pph | 4.59 pph |
| Feed syrup rate² | 60 pph | 78 pph | 60 pph | 60 pph | 60 pph |
| Recycle monomer rate⁴ | 4.8 pph | 4.8 pph | 4.2 pph | 7.2 pph | 4.8 pph |
| % monomer in feed³ | 44% | 47% | 49% | 32% | 41% |
| Monomer Temperature | 33°C. | 28°C. | 29°C. | 34°C. | 26°C. |
| Calc. Theoretical Feed Stream Temp. | 143°C. | 144 | 134 | 143 | 170 |
| Measured Feed Syrup Temp.¹ | 150°C. | 149°C. | 146°C. | 146°C. | 174°C. |

1 This measurement is believed to be on the high temperature side due to the small diameter of the line. The actual temperature of the mix of recycle syrup and added monomer (feed stream temperature) was difficult to measure due to the small size of the plastics.
2 Includes added monomer.
3 Includes monomer in recycle syrup.
4 Monomer obtained from flashing and extractor extruder.

EXAMPLES 1–5

| EXAMPLE | 1 | 2 | 3 | 4 | 5 |
|---|---|---|---|---|---|
| Discharge Syrup Temp. | 165°C. | 163°C. | 157°C. | 170°C. | 195°C. |
| Reactor Screw R.P.M. | 6.5 | 8.6 | 6.5 | 6.5 | 6.5 |
| Finisher Temperature | 280°C. | 280°C. | 280°C. | 280°C. | 280°C. |
| Product: Inherent Visc. | 0.56 | 0.56 | 0.59 | 0.54 | 0.42 |
| % Monomer | 0.23 | 0.22 | 0.34 | 0.31 | 0.43 |
| 300°C Wt. Loss | 1.17 | 1.02 | 1.64 | 1.73 | 4.10 |

EXAMPLE 7

In another run polymer of inherent viscosity 0.51 was made using "Lupersol" 101 initiator (Trade name for 2,5-Dimethyl-2,5-di(t-butylperoxy)hexane) with the reactor feed temperature at 155° C. and the discharge temperature 175° C. and all other conditions being as in Example 6.

The equipment used was the same as that in Examples 1 and 2.

I claim:

1. A continuous process for the production of acrylic polymer which comprises the steps
   a. forming a stream from acrylic monomer and a syrup comprising acrylic monomer and acrylic polymer, said syrup having a polymer content of 25 to 75 percent by weight, said stream being at a temperature of between 120° to 170° C., said stream containing between 30 and 80 percent by weight monomeric components, said stream containing a telogen, and an initiator,
   b. partially polymerizing said stream while advancing it through a reaction zone as the temperature of the stream increases substantially uniformly along the reaction zone a total of between 10° and 30° C. and the polymer content of the stream increases to 25 to 75 percent by weight of the stream,
   c. dividing the stream after it leaves the reaction zone into two unequal portions the larger of which is at least 55 percent by weight of the stream exiting from the reaction zone, recycling the larger portion to step (a) where it is utilized as the syrup,
   d. removing the monomer from the smaller portion and recyling the monomer to step (a) where it is utilized as a portion of the acrylic monomer, and
   e. recovering the acrylic polymer from said smaller portion.

2. The process of claim 1 in which between 1 and 25 percent by weight of the monomeric component in the feed stream is ethyl acrylate.

3. The process of claim 1 in which the reaction zone is substantially adiabatic.

4. The process of claim 1 in which the reaction zone temperature does not exceed 180° C., and the stream is increased in polymer content to between 50 and 70 percent by weight of the stream in the reaction zone.

5. The process of claim 1 in which the monomer is removed from the smaller portion by volatizing the monomer.

6. The process of claim 5 in which the monomer is volatized by flashing.

7. The process of claim 1 in which the initiator is tertiary butyl perbenzoate.

* * * * *